United States Patent

Hurford et al.

Patent Number: 5,468,828
Date of Patent: Nov. 21, 1995

[54] SILICONE RELEASE COMPOSITION

[75] Inventors: Simon R. Hurford, Cardiff; Bhukandas Parbhoo, Barry, both of Wales

[73] Assignee: Dow Corning Limited, Barry, Wales

[21] Appl. No.: 328,786

[22] Filed: Oct. 28, 1994

[30] Foreign Application Priority Data

Nov. 5, 1993 [GB] United Kingdom .................... 9322793

[51] Int. Cl.$^6$ ..................................................... C08G 77/06
[52] U.S. Cl. ................ 528/15; 528/31; 528/25; 427/387; 524/848
[58] Field of Search ................... 528/15, 31, 25; 427/387; 524/848

[56] References Cited

U.S. PATENT DOCUMENTS

| 5,190,827 | 3/1993 | Lin ............................................. 528/15 |
| 5,373,078 | 12/1994 | Juen et al. ................................ 528/15 |

FOREIGN PATENT DOCUMENTS

| 0108208 | 5/1984 | European Pat. Off. ........ C08L 83/04 |
| 0389138 | 9/1990 | European Pat. Off. ......... C08G 77/06 |
| 0400614 | 12/1990 | European Pat. Off. ...... C09D 183/04 |
| 0516108 | 12/1992 | European Pat. Off. ........ C08G 77/20 |
| 0523660 | 1/1993 | European Pat. Off. ........ C08G 77/50 |
| 1374792 | 11/1974 | United Kingdom ........... C08G 47/02 |
| 1542072 | 3/1979 | United Kingdom ............ C08L 83/04 |
| 2045788 | 11/1980 | United Kingdom ........... C08L 83/04 |

Primary Examiner—Melvyn I. Marquis
Attorney, Agent, or Firm—Timothy J. Troy

[57] ABSTRACT

A release modifier for silicone release compositions comprising a MQ resin consisting essentially of units of the formulae $$SiO_2 \text{ (Q) and } R_3SiO_{1/2} \text{ (M)}$$

wherein R denotes a monovalent hydrocarbon group having up to 3 carbon atoms, a hydrogen atom, an alkenyl group of the formula —R'CH=CH$_2$ or an oxyalkenyl group of the formula —OR'CH=CH$_2$, wherein R' denotes an alkylene group of from 4 to 12 carbon atoms, provided there is at least one group —R'CH=CH$_2$ or one group —OR'CH=CH$_2$ present per MQ molecule and that no more than 50% of all M units have such groups. Also claimed is a solventless release composition based on siloxanes having SiH groups and a catalyst in addition to the release modifier.

17 Claims, No Drawings

SILICONE RELEASE COMPOSITION

This invention relates to silicone release compositions. It relates more specifically to release compositions which are not in the form of an emulsion and more preferably to solventless release compositions. The invention mainly relates to release modifiers for said compositions.

Silicone release compositions have been known for a long time and have been the subject of many publications and patent specifications. They are useful in many applications where one requires a relatively non-adherent surface. In such applications release compositions are coated onto a substrate, and are caused to be cured. A particularly useful application is the coating of paper, polyethylene and other materials which are used among other applications for providing non-stick surfaces for contact with food or for backing surfaces e.g. for pressure sensitive adhesive labels, decorative laminates and transfer tapes. This invention is not concerned with release compositions in the form of an aqueous emulsion. Solventless release compositions, which are the preferred subject matter of the present invention have also been described in numerous publications. With solventless is meant compositions which do not include any organic solvent which could be environmentally undesirable. Examples of organic solvents are e.g. toluene and xylene. The advantages of using solventless systems are well known to the person skilled in the art of release coatings.

Silicone release compositions have been described for example in GB-1 374 792-A which discloses a solvent-free curable silicone release coating composition, having a certain viscosity and comprising a polydimethylsiloxane having up to 5% vinyl radicals, an organopolysiloxane having at least 3 silicon-bonded hydrogen atoms and a catalyst for the addition of —SiH groups to Si-vinyl groups, the —SiH and Si-vinyl groups being present in a ratio of at least 0.5/1. In GB-1542072-A it was taught to mix a vinyl-containing resin in conjunction with a low molecular weight vinyl (cyclo) siloxane with the curable silicone compo-sition to control the adhesive release force. In GB-2 045 788-A there is disclosed a composition similar to the one in GB-1 542 072-A, in which the low molecular weight vinyl siloxane can be left out.

Cured release coatings which result from the application and curing of release compositions containing vinyl-substituted polydimethyl siloxanes and organosilicon compounds with silicon-bonded hydrogen atoms have a very low release force. It is not always desirable to have the release force that low as in many applications it is important to maintain a certain amount of adhesive behaviour, e.g. in resealable closures for diapers or to provide several release liners with differing release forces, e.g. in double backed tapes. It is known to incorporate additives into silicone-based release coatings which cause an increase in release force required to peel off e.g. an adhesive label. Such additives are called "controlled-release additives" or "CRAs", and in some cases "high-release additives" or "HRAs". Materials which are typically used as CRAs include vinylated silicone resins comprising monovalent and tetravalent siloxane groups only, the so called MQ resins.

In EP-0 108 208-A it is taught that the use of vinylated MQ resins in conjunction with some unsaturated reactive diluents, selected from dibutylmaleate, decylvinylether, dodecylvinylether, camphene, $C_{16-18}$ α-olefin and meta-bis isopropenylbenzene provides a cheaper alternative CRA. Such CRA was useful in conjunction with release compositions comprising alkenyl or silanol-functional diorganopolysiloxanes, polymethyl hydrogen siloxanes, a precious metal catalyst and certain carboxylic acid ester inhibitors.

Vinylated MQ resin based CRAs do not, however, provide the industry with solutions to all their requirements. There is a continuing search for improved CRAs which will give increased release forces. There is particularly a need to provide a CRA which will give a controllable release force at low speed delamination and at higher speed delamination.

In EP 523 660 there is described a curable composition which comprises alkenyl siloxane copolymers, organopolysiloxanes having silicon-bonded hydrogen atoms and a suitable catalyst, wherein the alkenyl siloxane copolymers have (a) units of the formula $R_aSi(OR^1)_bO_{4-(a+b)/2}$ wherein R is a $C_{1-18}$ hydrocarbon, $R^1$ is a $C_{1-4}$ alkyl group, a and b is 0, 1, 2 or 3 and a+b is no more than 3, (b) at least one unit of the formula $AR_cSiO_{4-(c+1)/2}$ (wherein A is a group —$CH_2CHR^3R^2(CR^3=CH_2)_{x-1}$ wherein $R^2$ is a di-, tri or tetra-valent $C_{1-25}$ hydrocarbon group, $R^3$ is H or a $C_{1-6}$ alkyl group and x is 2, 3 or 4 and (c) on average at least one of certain units which have a silcarbane linkage. In addition there may be used vinylated MQ resins as described above.

We have now found that including certain resinous materials into CRAs gives release modifiers (RM) with improved performance, and even allow the use of the RMs as release compositions by mixing them with a crosslinker.

The present invention provides a release modifier (RM) for silicone release compositions which comprises a MQ resin consisting essentially of units of the formulae $$SiO_2 (Q) \text{ and } R_3SiO_{1/2} (M)$$

wherein R denotes a monovalent hydrocarbon group having up to 3 carbon atoms, a hydrogen atom, an alkenyl group of the formula —R'CH=$CH_2$ or an oxyalkenyl group of the formula —OR'CH=$CH_2$, wherein R' denotes an alkylene group of from 4 to 12 carbon atoms, provided there is at least one group —R'CH=$CH_2$ or one group —OR'CH=$CH_2$ present per MQ molecule and that no more than 50% of all units comprise a group R'CH=$CH_2$ or —OR'CH=$CH_2$.

Certain hexenyl-containing silicone resins are known and have been described in EP 516 108. The resins are said to find utility because of their solubility in organic solvents and the presence of the highly functional hexenyl group, particularly as a highly curable filler in addition reaction curing silicone compositions. The resins have the average formula ($CH_2$=$CHC_4H_8Me_2SiO_{1/2})_n$(SiO$)_m$ wherein Me is a methyl group, n and m are numbers larger than 0 and the ratio of n/m is 0.2 to 3.

In EP 400 614 there is described an organopolysiloxane composition for the formation of a peelable cured coating, which comprises an organopolysiloxane having 2 or more higher alkenyl groups, an organohydrogenpolysiloxane having at least two Si—H groups, a catalyst, an inhibitor, a solvent and an organopolysiloxane resin which is soluble in an organic solvent and consists of $R_3SiO_{1/2}$ (M) units, $R_2SiO_{2/2}$ (D) units or $RSiO_{3/2}$ (T) units and $SiO_{4/2}$ (Q) units, each molecule having at least two alkenyl groups of the formula $H_2C$=$CH(CH_2)_a$—where a has a value of from 2 to 8. The ratio of M/D/Q or M/T/Q is from 0.1–1.5/0.1–1.0/1. It is also mentioned that D and T units can be used together. The presence of the M, D and T units is said to increase the compatibility of the resin with the organopolysiloxane having alkenyl groups.

Suitable MQ resins for use in the RMs according to the invention consist essentially of monovalent and tetravalent siloxane units as indicated above, preferably they consist only of such units. However, it is allowable to have some other units present in small amounts without causing any negative effect. Extra units may include $HOR_2SiO_{1/2}$ units, and even some divalent and trivalent siloxane units, provided the extra units do not make up more than 2% of the total number of units in the resin molecule. It is also preferred that monovalent units wherein R denotes a hydrogen atom are kept to a minimum. These latter units are usually present as a result of incomplete reaction of the reagents used to form the MQ resin, as is indicated below.

Suitable MQ resins for use in the RM according to the invention preferably have a ratio of M units to Q units of from 1.1/1 to 1.8/1. At ratios which are lower than 1.1/1, the viscosity of the MQ resins is reasonably high, which makes the handling, incorporation and application of the RMs more difficult. Where the ratio is much lower than 1.1/1 the MQ resin would be solid under normal conditions of temperature and pressure, which would make it much more difficult to use the resins as potentially large amounts of solubiliser would be required in the RM composition. Potential solubilisers include organic solvents, e.g. xylene and toluene. However, it is preferred not to have such solvents present. At ratios which are higher than 1.8/1 the viscosity of the resins would be extremely low and although resin could be easily handled, the application onto a substrate could cause difficulty. It is preferred that the viscosity of the RM is at least about 100 mPa.s at 25° C. Also there is no effective increase of the release force of a release composition incorporating such MQ resin wherein the M/Q ratio is above 1.8/1. More preferred are those MQ resins wherein the ratio of M to Q units is from 1.2/1 to 1.6/1, most preferably 1.4/1.

The preferred MQ resins for use in the RM according to the invention are those in which the R units are exclusively made up of monovalent hydrocarbon groups having up to 3 carbon atoms and alkenyl groups of the formula —R'CH=CH$_2$ or oxyalkenyl groups of the formula —OR'CH=CH$_2$, wherein R' denotes an alkylene group of from 4 to 12 carbon atoms. Monovalent hydrocarbon groups may be alkyl or alkenyl groups, e.g. methyl, ethyl, propyl or vinyl. Preferably the monovalent hydrocarbon groups are alkyl groups having 1 or 2 carbon atoms, most preferably methyl groups. Groups R' are preferably alkylene groups with a carbon chain length of 6 to 10 carbon atoms, most preferably 8 to 10 carbon atoms. Preferably only one group —R'CH=CH$_2$ or —OR'CH=CH$_2$ is present on any one silicon atom. It is most preferred that the MQ resins are those in which the R units are exclusively made up of monovalent hydrocarbon groups having up to 3 carbon atoms and alkenyl groups of the formula —R'CH=CH$_2$, wherein R' is as defined above.

MQ resins for use in a RM according to the invention require that at least one —R'CH=CH$_2$ or —OR'CH=CH$_2$ substituent is present per molecule and no more than 50% of all M units have such substituent. It has been found that MQ resins with alkenyl substituents as indicated give a more beneficial increase in release force from a cured release coating comprising said RMs. More preferably from 10 to 35% of all M units have a —R'CH=CH$_2$ or —OR'CH=CH$_2$ subsitutent, most preferably from 15 to 25%.

The most efficient increase of release force for a cured release coating resulting from a release composition incorporating a RM according to the invention, is obtained when the weight percentage of the —R'CH=CH$_2$ or —OR'CH=CH$_2$ groups in the MQ resin of the RM is no more than 25% of the total weight of the MQ resin. More preferably the weight percentage is in the range from 5 to 20%. Even more preferably the weight percentage is in the range from 8 to 18%, most preferably 12 to 16%. It is also preferred that the ratio of units wherein one of the R groups is a group of the formula —R'—CH=CH$_2$ or —OR'—CH=CH$_2$ over tetravalent units of the formula SiO$_2$ is from 0.05/1 to 0.5/1, more preferably 0.1/1 to 0.4/1 and most preferably 0.2/1. Having higher number of substituents —R'CH=CH$_2$ or —OR'CH=CH$_2$ would cause, apart from no increase in release force and in some cases a decrease in release force, a denser crosslinking upon cure.

Examples of particularly useful MQ resins for the RMs according to the invention have the following ratio formulae (i.e. subscripts indicate the number ratio of the different units) wherein M denotes (CH$_3$)$_3$SiO$_{1/2}$ units, M$^n$ denotes [CH$_2$=CH—(CH$_2$)$_n$][CH$_3$]$_2$SiO$_{1/2}$, M$^{on}$ denotes [CH$_2$=CH—(CH$_2$)$_n$—O][CH$_3$]$_2$SiO$_{1/2}$, wherein n denotes the number of (CH$_2$) units in the alkenyl or oxyalkenyl substituent and Q denotes the group SiO$_2$: M$_{0.9}$M$^6_{0.2}$Q, M$_{1.2}$M$^8_{0.2}$Q, M$_{1.4}$M$^4_{0.4}$Q, M$_1$M$^{10}_{0.3}$Q and M$_1$M$^{12}_{0.3}$Q.

MQ resins which are suitable for use in the RMs according to the invention can be prepared by a number of processes. The most convenient process is an addition reaction of a dialkene of the general formula CH$_2$=CH—R"—CH=CH$_2$, wherein R" denotes an alkylene group of from 2 to 10 carbon atoms to a MQ resin having at least one silicon-bonded hydrogen atom in one of its mono-functional units (R$_3$SiO$_{1/2}$), in the presence of a catalyst which promotes the addition reaction between a group —SiH and an olefinic unsaturated compound. MQ resins having silicon-bonded hydrogen atoms are known materials and have been described in a number of publications, as are methods for making them. The reader is referred to e.g. EP-A-0 389 138. Suitable di-enes which may be used for the reaction are those of the formula CH$_2$=CH—R°—CH=CH$_2$, wherein R° denotes an alkylene group of from 2 to 10 carbon atoms. Examples of suitable di-enes include α,ω-hexadiene, α,ω-decadiene, α,ω-undecadiene and α,ω-dodecadiene. The addition reaction can be done under normal conditions in the presence of a suitable addition catalyst, e.g. a platinum based catalyst, as is described below.

An alternative method of making suitable MQ resins for use in the RMs according to the invention is the condensation reaction of an unsaturated alcohol, being a α-ol,ω-ene of the general formula HO—R'—CH=CH$_2$, wherein R' is as defined above with a MQ resin having at least one silicon-bonded hydrogen atom in one of its monofunctional units (R$_3$SiO$_{1/2}$), in the presence of a catalyst which promotes the condensation reaction between a group —SiH and an —COH group, giving as a byproduct H$_2$. Suitable catalysts for said reaction are Sn-based catalysts. Examples of suitable α-ol,ω-enes include HO—(CH$_2$)$_6$CH=CH$_2$, HO—(CH$_2$)$_8$CH=CH$_2$ and HO—(CH$_2$)$_{12}$CH=CH$_2$.

RMs according to the present invention may also comprise other ingredients, but are preferably solventless. Suitable ingredients include diluents, preferably siloxane materials. A particularly preferred siloxane material would be a linear alkenyl-substituted polydimethylsiloxane material, e.g. a α,ω-vinyl end-blocked dimethylpolysiloxane having a chainlength of from 10 to 500 siloxane units, preferably 15 to 100, most preferably 20 to 50.

RMs according to the present invention may also comprise inhibitors. These are known in the art and include dialkyl carboxylic esters containing C=C unsaturation, e.g. diallylmaleate, dimethylmaleate and butylallylmaleate and cyclic siloxanes of the general formula [(A)$_2$SiO]$_n$, wherein A denotes a group selected from lower alkyl groups, preferably C$_{1-4}$ alkyl groups and lower alkenyl groups, preferably vinyl or allyl groups, and n has a value of from 3 to 8. Most preferred are those cyclic siloxanes in which each silicon atom has one alkyl and one alkenyl group, preferably a methyl and a vinyl group. Preferably the value of n is 4 or 5. Examples of the most preferred siloxanes are methylvinyltetracyclosiloxane and methylvinylpentacyclosiloxane.

Other suitable ingredients for the RMs are catalysts. As the RM is intended for formation of cross-linked siloxane coatings by addition reaction with an organosilicon compound having silicon-bonded hydrogen atoms, suitable catalyst would be catalysts which promote said addition reaction. Suitable catalysts are accordingly those based on noble metals. A particularly suitable catalyst is a group VIII metal or a complex or compound thereof, platinum or rhodium based catalysts. Preferably it is a platinum compound or complex. Suitable platinum compounds and complexes include chloroplatinic acid, platinum acetylacetonate, complexes of platinous halides with unsaturated compounds such as ethylene, propylene, organovinylsiloxanes and styrene, hexamethyldiplatinum, $PtCl_2.PtCl_3$ and $Pt(CN)_3$. The preferred platinum catalysts are complexes of platinum compounds and vinyl siloxanes, e.g. those formed by the reaction of chloroplatinic acid and divinyltetramethyl disiloxane.

RMs according to the invention may also comprise a vinylated MQ resin consisting essentially of $SiO_2$ units, trimethyl siloxane units and vinyldimethyl siloxane units. These materials are well known. It is, however, preferred that such ingredients are not present in the RMs according to the present invention.

RMs according to the invention preferably comprise from 80 to 100% by weight of the MQ resins indicated above. More preferably 90 to 100%, and most preferably 95 to 98% by weight of the RM is taken up with the MQ resin. Other ingredients as described above, e.g. diluents, preferably takes up from 0.5 to 20% by weight of the RM composition, more preferably 0.5 to 5%. Sufficient of the catalyst should be employed to provide a homogenous and effective cure of the composition. The preferred proportion of platinum catalyst is usually that which will provide from about 1 to about 400 parts by weight of Pt per million parts by weight of the combined crosslinking components used in the total coating composition in which the RM is used, more preferably 50 to 150 parts, most preferably 100 to 130 parts.

In another aspect the invention provides novel solventless release compositions which incorporate the RMs according to the first aspect of the invention as described above.

According to that aspect of the invention there is provided a solventless release composition comprising (A) a release modifier which comprises a MQ resin consisting essentially of units of the formulae $SiO_2$ and $R_3SiO_{1/2}$, wherein R denotes a monovalent hydrocarbon group having up to 3 carbon atoms, a hydrogen atom or an alkenyl group of the formula —R'CH=CH_2 or an oxyalkenyl group of the formula —OR'CH=CH_2, wherein R' denotes an alkylene group of from 4 to 12 carbon atoms, provided there is at least one group —R'CH=CH_2 present per MQ molecule and that no more than 50% of all M units of the MQ resin comprise a group —R'CH=CH_2 or —OR'CH=CH_2, (B) an organosilicon compound having at least three silicon-bonded hydrogen atoms per molecule, (C) an effective amount of a precious metal catalyst capable of promoting the addition reaction between alkenyl or oxyalkenyl groups and silicon-bonded hydrogen groups and (D) optionally a diorganopolysiloxane having at least 2 alkenyl-functional silicon-bonded substituents.

Component (A) is as described above. Component (B) of the release composition is present as a cross-linking component or curing agent for the alkenyl and/or oxyalkenyl functional materials by addition reaction. Suitable organosilicon compounds for the cross-linking component have at least three silicon-bonded hydrogen atoms per molecule, preferably linked to three separate silicon atoms. Preferred suitable organosilicon compounds are substantially linear or cyclic materials. However, small amounts of trifunctional or tetra-functional siloxane units may also be present. Such units would have the general formula $SiO_2$ and $R^3SiO_{3/2}$, but they are preferably only present in amounts up to 3% based on the total number of units present in the organosilicon compounds, more preferably they are totally absent. It is preferred that the organosilicon compound has the general formula $R^2_2R^3SiO$—$[R^2_2SiO]_m$—$[R^2HSiO]_n$—$SiR^2_2R^3$ or

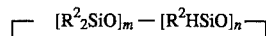

wherein $R^2$ denotes an alkyl or aryl group having up to 8 carbon atoms, $R^3$ denotes a group $R^3$ or a hydrogen atom, m has a value of from 0 to 20, n has a value of from 1 to 70, and there are at least 3 silicon-bonded hydrogen atoms present. It is not important if the silicon-bonded hydrogen atoms are on terminal silicon atoms or not. It is preferred that $R^2$ denotes a lower alkyl group having no more than 3 carbon atoms, most preferably a methyl group. $R^3$ preferably denotes a group $R^2$. Preferably m=0 and n has a value of from 6 to 40, more preferably 8 to 20, or where cyclic organosilicon materials are used from 3 to 8. The cross-linking component may comprise a mixture of several organosilicon compounds as described. As the organosilicon compound (B) forms part of a release composition which is solventless it is preferred that the viscosity of the component is kept low, which is particularly useful when the release composition also comprises high viscosity polymers, particularly those of component (D). In this way the total viscosity of the solventless release composition is kept reasonably low which is beneficial for the application of the composition to a substrate. Suitable viscosity for component (B) would be e.g. less than 0.1 Pa.s, preferably less than 0.05 Pa.s. Suitable organosilicon compounds are well known in the art and have been described in several publications, as is a method of making them.

The amount of cross-linking component which is used in a release coating composition is usually intended to provide a ratio of silicon-bonded hydrogen atoms over alkenyl and/or oxyalkenyl substituents of about 1/1, i.e. in stoichiometric amounts. The alkenyl and oxyalkenyl substituents which have to be taken into account include those present in the MQ resin of component (A), as well as those in any diluent or other material present in the RM, e.g. methylvinylcyclosiloxanes and alkenyl groups present in component (D) of the release composition. It is, however, preferred to have some excess of SiH groups present to ensure complete crosslinking of the composition and to avoid the presence of siloxane material which may bleed out of the composition, thus causing unwanted and detrimental effects. Preferred SiH/Si-alkenyl or Si-oxyalkenyl ratios are from 1.1/1 to 1.8/1, more preferably 1.1/1 to 1.4/1.

Component (C) is as discussed above for the RM composition. Some catalyst is usually already present in component (A), but additional amounts of the catalyst may be added as component (C), especially if large amounts of component (D) and small amounts of component (A) are used.

Component (D) is a polydiorganosiloxane having at least two alkenyl substituents per molecule. The alkenyl substituent may be a cycloalkenyl or linear alkenyl group, preferably with up to 6 carbon atoms as exemplified by cyclohexenyl, vinyl, allyl, pentenyl and hexenyl. More preferred would be cyclohexenyl, vinyl or allyl groups, most preferably vinyl. The preference is based on the ready availability of suitable polymers and the efficiency of the polymers in forming a cured release coating onto a substrate. Preferred polydiorganosiloxanes have the general formula $X_2Y°SiO—[X_2SiO]_x—[XYSiO]_y—SiX_2Y°$ wherein each X denotes independently, a phenyl radical or a saturated hydrocarbon group having 1 to 6 carbon atoms, e.g. alkyl or cycloalkyl group, for example, methyl, ethyl, propyl, butyl and cyclohexyl. At least 90% of all the X substituents of the polydiorganosiloxane are preferably methyl groups, most preferably all. Y denotes an alkenyl group having up to 6 carbon atoms, as identified above, and Y° denotes a group Y or a group X. It is, however, preferred that each alkenyl group Y in component (D) is a vinyl or hexenyl group. It is preferred that no more than 1% of all units of the siloxane are units with a vinyl group, otherwise there is a danger of crosslinking the release composition too much upon curing. Although it is preferred that no silicon-bonded substituents are present apart from X, Y and Y°, it is possible that small amounts (less than 1% of all substituents present) of other substituents are present, e.g. hydroxyl groups. Even though the polydiorganosiloxanes suitable as component (D) in the composition according to the invention are substantially linear polymers, it is allowable that a small number of units (no more than 1% of the total number of units) cause branching of the polymer. Such units would be tetrafunctional or trifunctional units of the formula $SiO_2$ or $Y°SiO_{3/2}$ respectively. Preferably no such units are present.

The average value of the sum total of x and y in the above formula is such that the resulting viscosity of the polydiorganosiloxane is at least 10 mPa.s at 25° C. Preferably the viscosity at 25° C. is in the range from 0.05 to 5 Pa.s, more preferably 0.1 to 1 Pa.s, most preferably 0.2 to 0.5 Pa.s. Such polydiorganosiloxanes are well known in the art as is a method for their preparation.

Release compositions according to the invention may comprise only components (A), (B) and (C). In such situations (C) would be present in catalytic amounts, while (A) and (B) would be present in amounts to give the SiH/Si-alkenyl or Si-oxyalkenyl ratio mentioned above. It is, however, preferred in all but some special applications that the release composition also comprises component (D). The amount of component (D) in relation to component (A) will depend on the desired release characteristics of the cured release coating, and a number of factors influence this amount. It is most easily expressed as the percentage of component (A) by weight based on the total weight of components (A), (C) and (D) combined. This may range from 1% to 100%, but more typically will lie in the range from 10 to 80% by weight. The factors which influence the amount of each ingredient used in the composition include the desired release force, the desired delamination speed of the final product in use, the cure time and temperature requirements, desire to avoid slipstick etc.

Optionally a release composition according to the invention comprises additional ingredients. A particularly useful optional ingredient is an MQ resin having vinyl substituents on some of the monofunctional units. Such ingredients are known and have been described above and in the prior art. Another useful ingredient is α-olefin, particularly olefins having 12 to 20 carbon atoms, e.g. tetradecene, octadecane and eicosene. Other ingredients include e.g. cure inhibitors and bath life extenders. Such additives are also well known in the art and have been discussed above. Still other potential additives include colorants, dyes, preservatives and fragrances.

Release compositions according to the invention may be prepared by any known method, including mixing the ingredients. For storage stability purposes it is preferred to keep components (A) and (C) separate from component (B). This could be achieved for example by mixing components (A), (C) and part of component (D) as a first mixture, and mixing component (B) with the rest of component (D) as a second mixture. Alternatively each of the components may be stored and supplied separately. In yet another option component (A) is supplied as a first part, component (B) as a second part and a mixture of components (C) and (D) as a third part. Each part could also inlcude some other additional ingredients, e.g. an inhibitor. Immediately prior to using the composition for application to substrates the different parts and/or mixtures could be admixed in the required ratios, e.g. 1/1, 10/1 or even 100/1.

The invention also provides in another aspect a process of coating a substrate to provide release of adhesive materials therefrom, the process comprising applying to a substrate a solventless release composition as described above, and thereafter causing the composition to cure.

Any solid substrate may be treated by the process of this invention to provide release of adhesive materials therefrom. Examples of suitable substrates include cellulosic materials, such as paper, cardboard and wood, metals such as aluminium, iron and steel, siliceous materials such as ceramics, glass and concrete and synthetics such as polyester and polyepoxide. To assure proper curing and adhesion of the curable release composition the substrate to which it is applied should be clean and free of materials which undesirably inhibit the cure of the release composition, such as materials containing amines, mercaptans and phosphines.

The process of this invention is particularly useful for coating flexible substrates, such as paper, aluminium foil and tapes to provide controlled release of pressure sensitive adhesive materials such as aggressive acrylic adhesives. The curable release composition may be applied in a thin layer to the surface of the flexible substrate to provide a coating with a mass of approximately one gram per square meter of coated surface. In the paper coating art the amount of release coating will generally be applied in an amount between 0.1 to 2.0 grams per square meter of surface.

In the process according to the invention the curable release composition may be applied to a substrate by any suitable means, such as brushing, dipping, spraying, rolling and spreading. Flexible substrates, such as paper may be coated by any of the well known rolling methods, such as by a trailing blade coater, kiss rolls, gravure rolls and offset printing rolls as desired.

After application to a substrate the silicone release composition is allowed to cure. Preferably the curing is accelerated by the application of heat to the applied composition. Heating usually limited to temperatures less than 300° C., preferably less than 200° C., may be accomplished by any suitable means. However, the release composition should not be heated too much prior to application. In many cases release compositions according to the invention will cure to a state sufficient to give no smear, no migration and no rub-off quicker than prior art applications.

Cured release compositions according to the invention tend to result in a coating which requires a higher release force to remove adhesive therefrom both at low and at high delamination speeds (e.g. 0.5 and 300 m/minute resp.).

There now follow a number of examples in which all parts and percentages are given by weight unless otherwise indicated.

EXAMPLE 1

To a reaction vessel there was charged 486 g of hexamethyldisiloxane, 67 g of tetramethyldisiloxane, 150 g of ethanol, 300 g of water and 200 g of hydrochloric acid. The mixture was stirred at room temperature (20° C.) till homogeneous. 1041.5 g of tetraethoxysilane was added dropwise to the vessel over a period of 2 hours, allowing the temperature to rise to 50° C. After complete addition of the silane the mixture was stirred for another 2 hours in order to reach equilibrium. Then 200 g of water was added and the mixture was allowed to stand to separate the aqueous/alcohol layer. The resulting siloxane compound was removed and dried by adding 80 g of anhydrous magnesium sulphate. After filtration the siloxane was purified under reduced pressure (6.66 kPa) and increased temperature (110° C.) to give a clear, colourless, liquid MQ resin with a viscosity of 900 mPa.s and a ratio formula of $M_{1.2}M^H_{0.2}Q$, wherein M denotes $(CH_3)_3SiO_{1/2}$, $M^H$ denotes a group $(CH_3)_2HSiO_{1/2}$ and Q denotes a group $SiO_2$. To a second vessel was charged 37 g of α,ω-decadiene, 20 g of toluene and 0.1 ml of a platinum catalyst. The mixture was stirred and a nitrogen blanket applied. Then the mixture was heated to 80° C., after which 100 g of the resin $M_{1.2}M^H_{0.2}Q$ prepared above, was added dropwise to the mixture, maintaining the temperature through the exotherm reaction. The reaction mixture was checked for SiH by infrared spectroscopy, and when none was present the mixture was allowed to cool. Unreacted decadiene and toluene were stripped off at 120° C. The resultant product was a yellowish clear liquid MQ resin (MQ1) with a viscosity of 750 mPa.s and a ratio formula of $M_{1.2}M^D_{0.2}Q$, wherein $M^D$ denotes a group $[CH_2=CH(CH_2)_8][CH_3]_2SiO_{1/2}$.

EXAMPLES 2 TO 6

Similar reactions were carried out using adjusted amounts of material to provide liquid clear resins of the following respective ratio formulae:

(Ex 2) $M_{1.4}M^D_{0.4}Q$ (MQ2)

(Ex 3) $M_{1.1}M^D_{0.4}Q$ (MQ3)

(Ex 4) $M_{1.2}M^X_{0.2}Q$ (MQ4)

(Ex 5) $M_{1.2}M^T_{0.2}Q$ (MQ5)

(Ex 6) $M_{1.1}M^X_{0.4}Q$ (MQ6)

wherein $M^X$ denotes a group $[CH_2=CH(CH_2)_4][CH_3]_2SiO_{1/2}$, wherein $M^T$ denotes a group $[CH_2=CH(CH_2)_{12}][CH_3]_2SiO_{1/2}$.

EXAMPLE 7

A release modifier (RM 1) composition was prepared by mixing 96.84 parts of the MQ resin of Example 1 with 1.85 parts of a platinum based catalyst and 1 part of methylvinylcyclosiloxane, which is present as a bath life extender. A release composition (REL1) was then prepared by adding sufficient of a mixture of a short-chain trimethylsiloxane end-blocked methylhydrogensiloxane polymer and dimethyl/methylhydrogen siloxane copolymer to give a SiH/Si-alkenyl or oxyalkenyl number ratio of 1.15/1.

EXAMPLES 8 TO 12

Release modifiers RM 2 to RM 6 and release compositions REL 2 to REL 6 were prepared as for Example 7 with the difference that the MQ resins of Examples 2 to 6 were used in Examples 8 to 12 respectively.

EXAMPLES 13 TO 15

Further release compositions were prepared by mixing RM 1 or RM 2 with a "premium" release coating, consisting of a vinyldimethylsiloxane end-blocked polydimethylsiloxane having an average viscosity at 25° C. of about 450 mPa.s (PR1), a mixture of about 10% of a vinyldimethylsiloxane end-blocked polydimethylsiloxane with a viscosity at 25° C. of several Pa.s, 65% of a MQ resin having trimethylsiloxane and vinyldimethylsiloxane units as its monofunctional units and 25% of an α-olefin having an average chain length of 18 carbon atoms (PR2), a mixture of 97% of a copolymer of dimethylsiloxane and vinylmethylsiloxane units end-blocked with vinyldimethyl siloxane units and 3% of a vinyldimethyl siloxane end-blocked polydimethylsiloxane with a viscosity at 25° C. of about 350 mPa.s (PR$_3$) or a mixture of about 50% of a vinyldimethyl siloxane end-blocked polydimethyl siloxane with a viscosity at 25° C. of about 25 mPa.s and about 50% of a MQ resin having trimethylsiloxane and vinyldimethylsiloxane units as its monofunctional units (PR4), according to the ratios given in Table I, and by mixing in each case sufficient of a mixture of a short-chain trimethylsiloxane end-blocked methylhydrogen siloxane polymer and dimethyl/methylhydrogen siloxane copolymer to give a SiH/Si-alkenyl number ratio of 1.15/1.

TABLE I

| Release Composition | MQ used | PR used | RM/Premium ratio |
|---|---|---|---|
| REL 1 | MQ1 | — | 100/0 |
| REL 2 | MQ2 | — | 100/0 |
| REL 3 | MQ3 | — | 100/0 |
| REL 4 | MQ4 | — | 100/0 |
| REL 5 | MQ5 | — | 100/0 |
| REL 6 | MQ6 | — | 100/0 |
| REL 7 | MQ1 | PR1 | 80/20 |
| REL 8 | MQ1 | PR1 | 75/25 |
| REL 9 | MQ1 | PR1 | 50/50 |
| REL 10 | MQ1 | PR1 | 25/75 |
| REL 11 | MQ1 | PR3 | 80/20 |
| REL 12 | MQ1 | PR4 | 50/50 |
| REL 13 | MQ2 | PR1 | 75/25 |
| REL 14 | MQ2 | PR1 | 50/50 |
| REL 15 | MQ2 | PR1 | 25/75 |

Comparative Examples 1 to 12

Release compositions CREL 1 to CREL 4 were prepared comprising only PR1, PR2, PR$_3$ and PR4 respectively mixed in each case with sufficient of a cross-linker mixture of a short-chain trimethylsiloxane end-blocked methylhydrogen siloxane polymer and dimethyl/methylhydrogen siloxane copolymer to give a SiH/Si-alkenyl number ratio of 1.15/1. Release compositions CREL 5 and 6 were prepared in the same manner except that instead of only using PR2 or PR4, there was used a mixture of respectively 80% PR2 or PR4 in 20% PR3. Release compositions CREL 7 and 8 were prepared in the same manner as CREL 6 and 7, except that instead of only using 20% PR$_3$, there was used 20% of PR1. CREL 9, 10 and 11 were prepared in a similar way, but used respectively 25%, 50% and 75% PR2, in 75%, 50% and 25% PR1. CREL 12 consisted of a MQ resins with some vinyl substituted monofunctional units and with the ratio formula $M_{1.1}M^{vi}_{0.4}Q$, wherein M denotes trimethylsiloxane, $M^{vi}$ denotes dimethylvinylsiloxane and Q denotes $SiO_2$. CREL 13 was prepared according to Examples 7 to 12 with the difference that the MQ resin used had the general formula $M^x_{1.4}Q$. CREL 14 and 15 were prepared according to Examples 7 to 12 with the difference that the MQ resin was replaced by a siloxane of the formulae $M^xD_{145}D^x_3M^x$ and $M^xD_{200}M^x$ respectively, where $M^x$ is as defined above for Examples 2 to 6, D is a $(CH_3)_2SiO$ unit and $D^x$ is a $CH_3[CH_2=CH(CH_2)_4]SiO$ unit.

EXAMPLE 20

Release coatings were applied to Glassine® (AV100) paper using a Euclid® laboratory coater, to give a coverage of 1 g/m². The coated paper is then placed in an oven at 120° C. or 150° C. till cured to a condition of no smear, no migration and no rub-off (NNN). All further testing was done on these samples when cured to NNN. As an example of time required to reach NNN at 120° C., REL 1 was measured and compared with CREL1 and CREL4. The time required was 20s, 30s and 50s respectively. Laminates were prepared using standard TESA® tapes, after ageing the coated paper for 24 hours at room temperature (20° C.). Three tapes were used in particular: TESA®7475, which uses an acrylic adhesive and TESA®4154 and 7476, which use a rubber adhesive. Delamination of the tapes from the paper sheets was effected using a Lloyd® Instrument delaminator for a delamination speed of 0.3 m/minute or a Imass® ZPE1000 for higher delamination speeds. Delamination was usually done after storing the laminated paper for 4 weeks at room temperature (20° C.). Some were done immediately showing that there was no effect (neither negative nor positive) as a result of storing the laminated paper. Release forces were determined and are given in Table II (a) and Table II (b). In some cases the subsequent adhesive strength (SAS) was also measured by reapplying the delaminated adhesive tape to a clean plastic sheet, and measuring the release force as a percentage of the release force required for delaminating a blank piece of Sellotape® from the same plastic sheet. A value of >90% SAS is acceptable as lower values indicate that some of the release coating has transferred onto the adhesive substrate. In some cases also the slipstick factor was measured which is an indication of the smoothness of the release. Slipstick factor is calculated as the mean release force maxima (average of 10 points) over the mean release force. The lower the factor, the smoother is the delamination. In Table II (a) and Table II (b) release forces are given in g/20 mm and delamination speed in meter/minute.

TABLE II (a)

| Release Composition | Tape | Release Force at Delamination Speed of | | | | | | |
|---|---|---|---|---|---|---|---|---|
| | | 0.3 | 2.4 | 10 | 50 | 100 | 200 | 300 |
| REL 1 | 4154 | 837 | — | — | — | — | 170 | 110 |
| REL 1 | 7475 | 795 | — | 210 | 150 | 130 | 100 | 80 |
| REL 1 | 7476 | 790 | — | — | 100 | 100 | 75 | 50 |
| REL 2 | 7475 | 350 | — | — | — | — | — | 80 |
| REL 2 | 7476 | 400 | — | — | — | — | — | 24 |
| REL 3 | 7475 | 286 | — | — | — | — | — | — |
| REL 3 | 7476 | 506 | — | — | — | — | — | — |
| REL 4 | 7475 | 195 | 122 | 130 | — | 165 | — | 119 |
| REL 4 | 7476 | 439 | 218 | 157 | — | 61 | — | 34 |
| REL 5 | 7475 | 625 | — | — | — | — | — | — |
| REL 5 | 7476 | 620 | — | — | — | — | — | — |
| REL 6 | 7475 | 605 | — | — | — | — | — | — |
| REL 6 | 7476 | 504 | — | — | — | — | — | — |
| REL 7 | 4154 | 90 | — | 215 | 135 | 100 | 70 | 55 |
| REL 7 | 7475 | 40 | — | 115 | 155 | 150 | 115 | 100 |
| REL 7 | 7476 | 140 | — | 125 | 80 | 65 | 40 | 35 |
| REL 8 | 7475 | 155 | 107 | 133 | — | 185 | — | 106 |
| REL 8 | 7476 | 193 | 170 | 115 | — | 37 | — | 20 |
| REL 9 | 7475 | 75 | 70 | 85 | — | 118 | — | 108 |
| REL 9 | 7476 | 110 | 127 | 113 | — | 46 | — | 25 |
| REL 10 | 7475 | 24 | 39 | 52 | — | 85 | — | 91 |
| REL 10 | 7476 | 79 | 80 | 68 | — | 32 | — | 22 |
| REL 11 | 4154 | 190 | — | 200 | 140 | 95 | 60 | 50 |
| REL 11 | 7475 | 65 | — | 105 | 135 | 135 | 100 | 85 |
| REL 11 | 7476 | 230 | — | 130 | 70 | 55 | 40 | 30 |
| REL 12 | 4154 | 325 | — | — | — | — | — | — |
| REL 12 | 7475 | 311 | — | — | — | — | — | — |
| REL 13 | 7475 | 115 | — | — | — | — | — | 85 |
| REL 13 | 7476 | 120 | — | — | — | — | — | 20 |
| REL 14 | 7475 | 90 | — | — | — | — | — | 45 |
| REL 14 | 7476 | 90 | — | — | — | — | — | 21 |
| REL 15 | 7475 | 75 | — | — | — | — | — | 30 |
| REL 15 | 7476 | 60 | — | — | — | — | — | 19 |

TABLE II (b)

| Release Composition | Tape | Release Force at Delamination Speed of | | | | | | |
|---|---|---|---|---|---|---|---|---|
| | | 0.3 | 2.4 | 10 | 50 | 100 | 200 | 300 |
| CREL 1 | 7475 | 10 | 29 | 53 | — | 56 | — | 52 |
| CREL 1 | 7476 | 58 | 26 | 24 | — | 18 | — | 15 |
| CREL 2 | 4154 | 210 | — | — | 160 | 125 | 95 | 70 |
| CREL 2 | 7475 | 360 | — | 160 | 110 | 100 | 60 | 50 |
| CREL 2 | 7476 | 600 | — | — | 80 | 60 | 50 | 45 |
| CREL 4 | 4154 | 250 | — | 195 | 110 | 85 | 50 | 45 |
| CREL 4 | 7475 | 180 | — | 104 | 95 | 80 | 60 | 50 |
| CREL 4 | 7476 | 350 | — | 115 | 60 | 45 | 40 | 30 |
| CREL 5 | 4154 | 55 | — | 170 | 90 | 85 | 55 | 45 |
| CREL 5 | 7475 | 70 | — | 105 | 90 | 75 | 55 | 45 |
| CREL 5 | 7476 | 300 | — | 105 | 50 | 40 | 25 | 20 |
| CREL 6 | 4154 | 150 | — | 100 | 70 | 50 | 35 | 30 |
| CREL 6 | 7475 | 45 | — | 75 | 80 | 75 | 65 | 55 |
| CREL 6 | 7476 | 180 | — | 75 | 40 | 30 | 25 | 20 |
| CREL 7 | 7476 | 225 | — | 100 | 55 | 40 | 25 | 20 |
| CREL 7 | 4154 | 50 | — | 145 | 95 | 75 | 60 | 5 |
| CREL 7 | 7475 | 55 | — | 100 | 95 | 75 | 55 | 45 |
| CREL 8 | 4154 | 90 | — | 105 | 70 | 50 | 45 | 30 |
| CREL 8 | 7475 | 30 | — | 75 | 95 | 85 | 75 | 70 |
| CREL 8 | 7476 | 140 | — | 80 | 45 | 35 | 25 | 20 |
| CREL 9 | 7475 | 20 | — | — | — | — | — | 55 |
| CREL 9 | 7476 | 75 | — | — | — | — | — | 17 |
| CREL 10 | 7475 | 75 | — | — | — | — | — | 65 |
| CREL 10 | 7476 | 80 | — | — | — | — | — | 19 |
| CREL 11 | 7475 | 160 | — | — | — | — | — | 45 |
| CREL 11 | 7476 | 150 | — | — | — | — | — | 20 |
| CREL 12 | 7475 | 120 | — | — | — | — | — | — |
| CREL 12 | 7476 | 223 | — | — | — | — | — | — |
| CREL 13 | 7475 | 222 | — | — | — | — | — | — |
| CREL 13 | 7476 | 154 | — | — | — | — | — | — |
| CREL 14 | 7475 | 11 | 19 | 21 | — | 45 | — | 11 |
| CREL 14 | 7476 | 31 | 25 | 21 | — | 11 | — | 9 |
| CREL 15 | 7475 | 11 | 17 | 18 | — | 38 | — | 10 |
| CREL 15 | 7476 | 40 | 31 | 24 | — | 13 | — | 9 |

It can be seen from the above results that in general the use of RMs according to the invention gives a better (higher) release force over the range of delamination speeds. It is also clear that the best performing materials are those according to the preferred embodiments of the invention. Slipstick was measured for REL 1, REL 4, REL 5, REL 11, CREL 4, and CREL 12, and gave the results shown in Table III.

TABLE III

| Release Composition | Slipstick factor for | | |
|---|---|---|---|
| | 4154 | 7475 | 7476 |
| REL 1 | 1.04 | 1.09 | 1.08 |
| REL 4 | — | 1.07 | 1.10 |
| REL 5 | — | 1.04 | 1.08 |

TABLE III-continued

| Release Composition | Slipstick factor for | | |
|---|---|---|---|
| | 4154 | 7475 | 7476 |
| REL 11 | 1.35 | 1.08 | — |
| CREL 4 | 1.08 | 1.07 | — |
| CREL 12 | — | 1.04 | 2.60 |

The table shows especially that a direct comparison between prior art MQ resin (CREL12) and MQ resins for use in RMs according to the invention shows a much more acceptable slipstick factor, i.e. a much quieter release. The SAS was acceptable in all tested cases.

That which is claimed is:

1. A release modifier for silicone release compositions comprising a MQ resin consisting essentially of units of the formulae

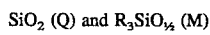
$SiO_2$ (Q) and $R_3SiO_{1/2}$ (M)

wherein R is selected from the group consisting of monovalent hydrocarbon groups having up to 3 carbon atoms, a hydrogen atom, an alkenyl group of the formula —R'CH=CH$_2$ and an oxyalkenyl group of the formula —OR'CH=CH$_2$, wherein R' denotes an alkylene group of from 4 to 12 carbon atoms, provided there is at least one group selected from the group consisting of —R'CH=CH$_2$ and —OR'CH=CH$_2$ present per MQ molecule and that no more than 50% of all M units comprise a substituent selected from the group consisting of —R'CH=CH$_2$ and —OR'CH=CH$_2$ groups.

2. A release modifier according to claim 1 wherein the MQ resins consist essentially of monovalent (M) and tetravalent (Q) siloxane units in ratio of from 1.1/1 to 1.8/1.

3. A release modifier according to claim 1 wherein all R units are selected from the group consisting of methyl groups and groups of the formula —R'CH=CH$_2$, wherein R' denotes an alkylene group of 6 to 10 carbon atoms.

4. A release modifier according to claim 1 wherein the weight percentage of the —R'CH=CH$_2$ or —OR'CH=CH$_2$ groups in the MQ resin is no more than 25% of the total weight of the MQ resin.

5. A release modifier according to claim 1 wherein the ratio of units wherein one of the R groups is selected from the group consisting of a group of the formula —R'—CH=CH$_2$ and a group of the formula —OR'—CH=CH$_2$ over tetravalent units of the formula SiO$_2$ is from 0.05/1 to 0.5/1.

6. A release modifier according to claim 1 which comprises from 90 to 100% by weight of the MQ resins.

7. A solventless release composition comprising (A) a release modifier which comprises a MQ resin consisting essentially of units of the formulae SiO$_2$ and R$_3$SiO$_{1/2}$ wherein R is selected from the group consisting of a monovalent hydrocarbon group having up to 3 carbon atoms, a hydrogen atom, an alkenyl group of the formula —R'CH=CH$_2$ and an oxyalkenyl group of the formula —OR'CH=CH$_2$, wherein R' denotes an alkylene group of from 4 to 12 carbon atoms, provided there is at least one group —R'CH=CH$_2$ present per MQ molecule and that no more than 50% of all M units comprise a substituent selected from the group consisting of —R'CH=CH$_2$ and —OR'CH=CH$_2$ groups, (B) an organosilicon compound having at least three silicon-bonded hydrogen atoms per molecule, (C) an effective amount of a precious metal catalyst capable of promoting the addition reaction between alkenyl or oxyalkenyl groups and silicon-bonded hydrogen groups and (D) optionally a diorganopolysiloxane having at least 2 alkenyl-functional silicon-bonded substituents.

8. A solventless release composition according to claim 7 wherein Component (B) is selected from the group consisting of organosilicon compounds having the general formula $R^2{}_2R^3SiO$—$[R^2{}_2SiO]_m$—$[R^2HSiO]_n$—$SiR^2{}_2R^3$ and organosilicon compounds having the general formula

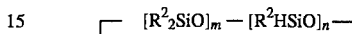
$[R^2{}_2SiO]_m$ — $[R^2HSiO]_n$ wherein R$^2$ is selected from the group consisting of alkyl and aryl groups having up to 8 carbon atoms, R$^3$ is selected from the group consisting of a group R$^2$ and a hydrogen atom, m has a value of from 0 to 20, n has a value of from 1 to 70, and there are at least 3 silicon-bonded hydrogen atoms present.

9. A solventless release composition according to claim 7 wherein the number ratio of SiH/Si-alkenyl or Si-oxyalkenyl is from 1.1/1 to 1.8/1.

10. A solventless release composition according to claim 7 Component (D) is present and is a polydiorganosiloxane having the general formula X$_2$Y°SiO—[X$_2$SiO]$_x$—[XYSiO]$_y$—SiX$_2$Y°, wherein each X is selected from a group consisting of a phenyl radical and a saturated hydrocarbon group having 1 to 6 carbon atoms, at least 90% of all X groups being methyl groups, Y denotes an alkenyl group having up to 6 carbon atoms, Y° is selected from a group consisting of a group Y and a group X and the average value of the sum total of x and y is such that the resulting viscosity of the polydiorganosiloxane is at least 10 mPa.s at 25° C.

11. A solventless release coating according to claim 10 wherein each alkenyl group Y in component (D) is a vinyl or hexenyl group.

12. A solventless release composition according to claim 7 wherein the weight percentage of component (A) based on the total weight of components (A), (C) and (D) combined is from 10 to 80%.

13. A solventless release composition according to claim 7 which also comprises one or more ingredients selected from the group consisting of MQ resins having vinyl substituents on some of the monofunctional units, α-olefins, cure inhibitors and bath life extenders.

14. A solventless release composition according to claim 7 which is stored by keeping components (A) and (C) separate from component (B).

15. A process of coating a substrate comprising applying to the substrate a solventless release composition according to claim 7 and thereafter causing the composition to cure.

16. A process according to claim 15 wherein the substrate is flexible and the composition is applied to the substrate in a layer of 0.1 to 2.0 grams per square meter of surface.

17. A process according to claim 15 wherein the curing is effected by heating the coated substrate to a temperature below 200° C.

* * * * *